Dec. 20, 1938.   C. C. BENNETT   2,140,686
FRAME STRAIGHTENER
Filed April 16, 1934   7 Sheets-Sheet 1
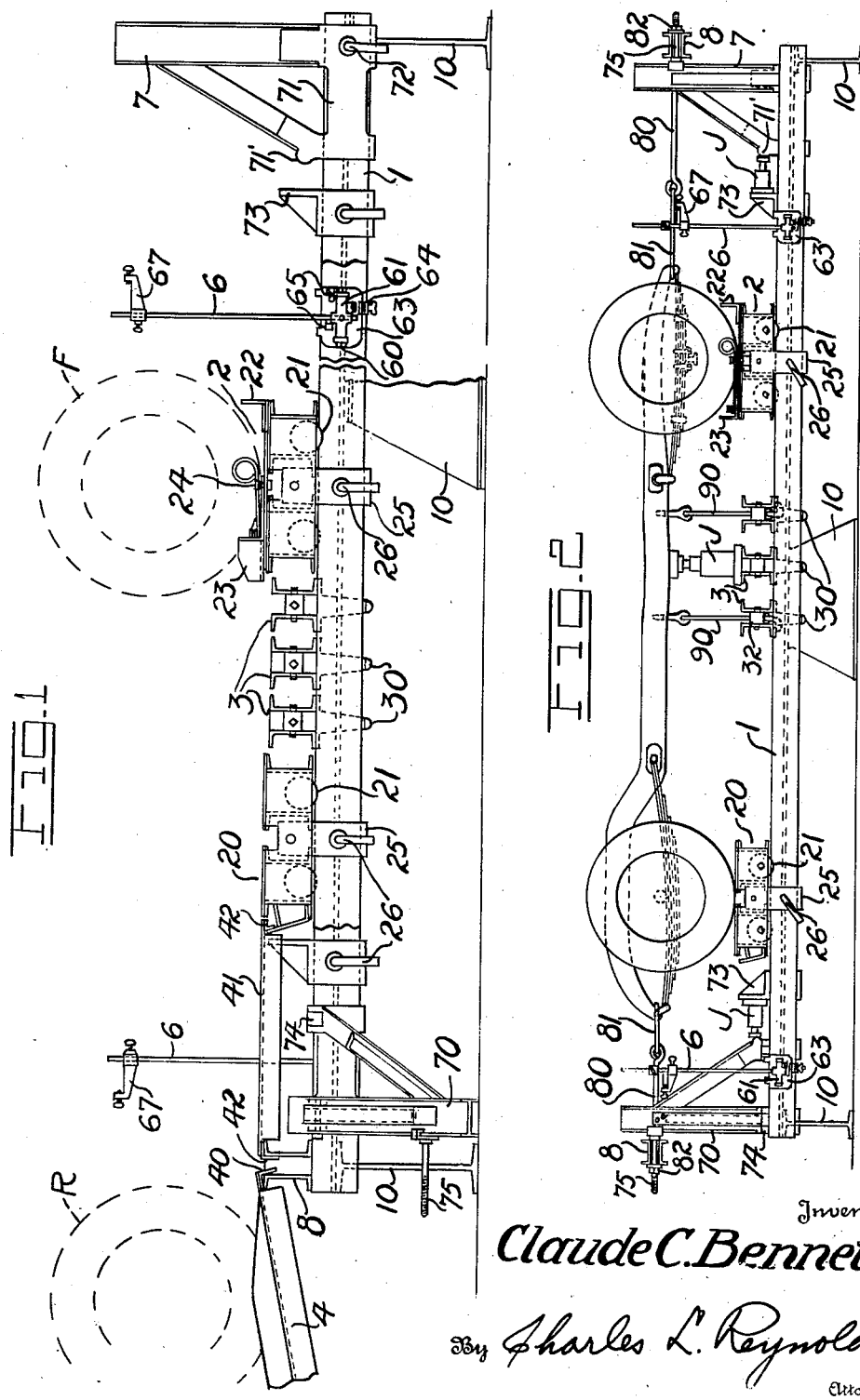
Inventor
Claude C. Bennett
By Charles L. Reynolds
Attorney

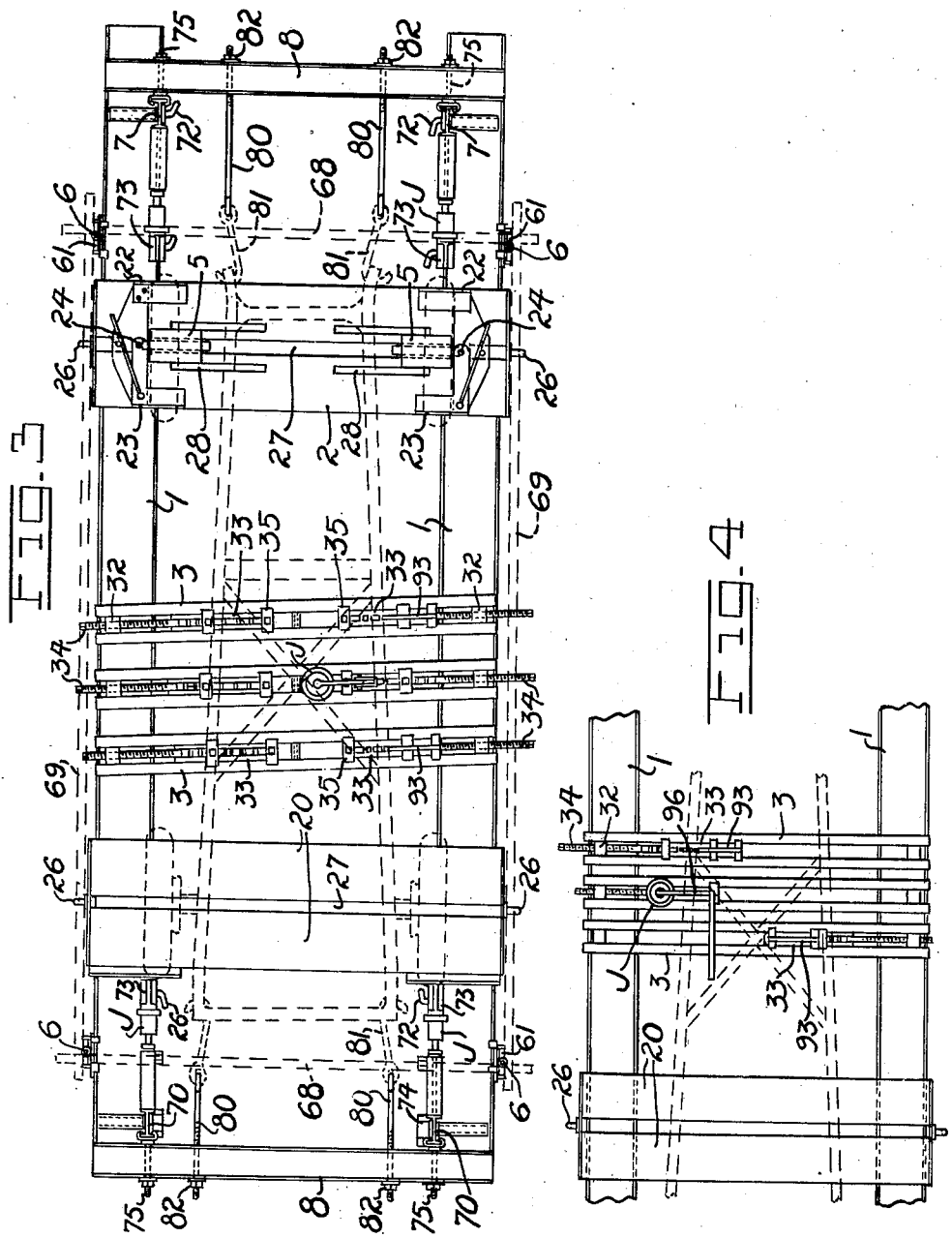

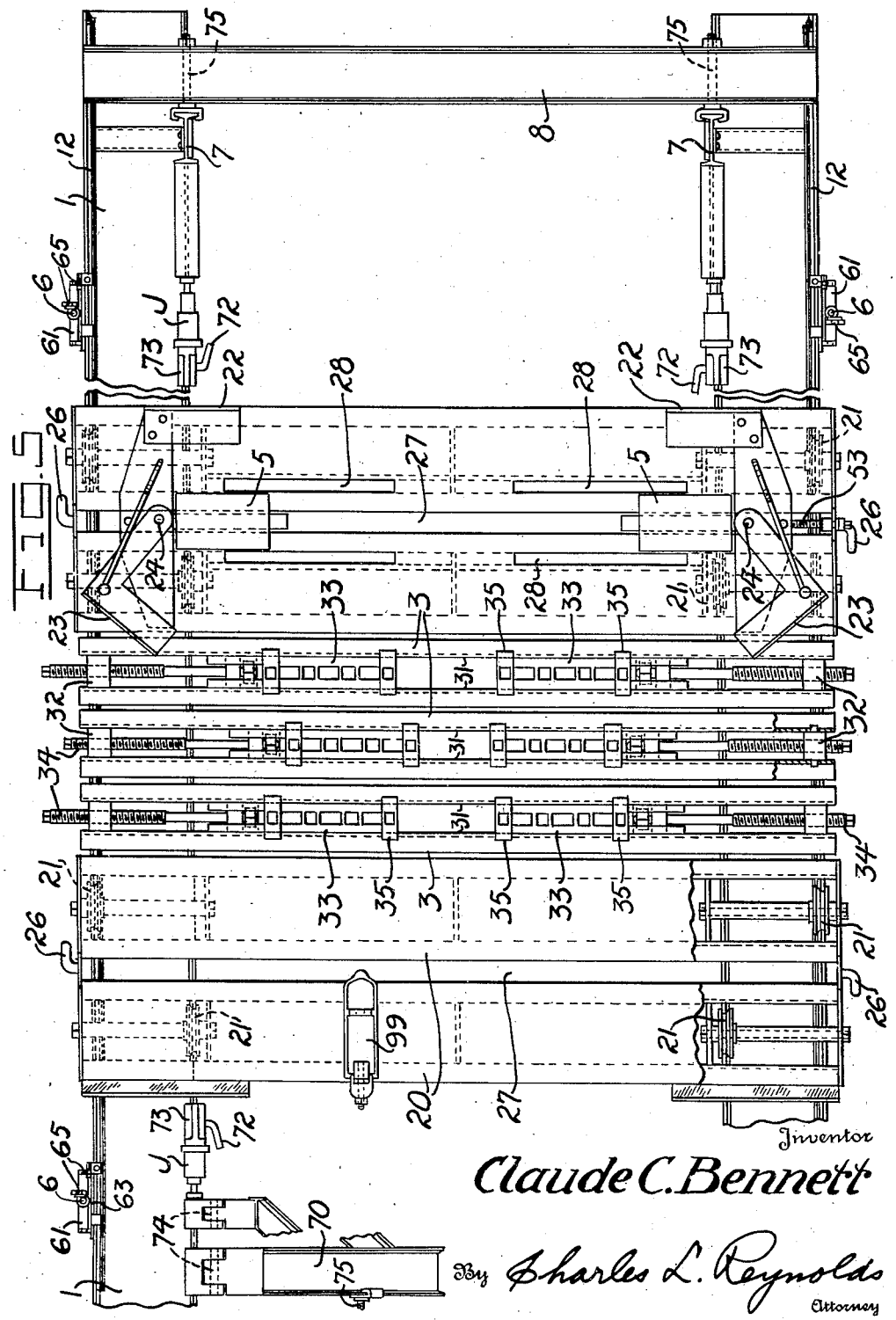

Dec. 20, 1938.  C. C. BENNETT  2,140,686
FRAME STRAIGHTENER
Filed April 16, 1934  7 Sheets-Sheet 4
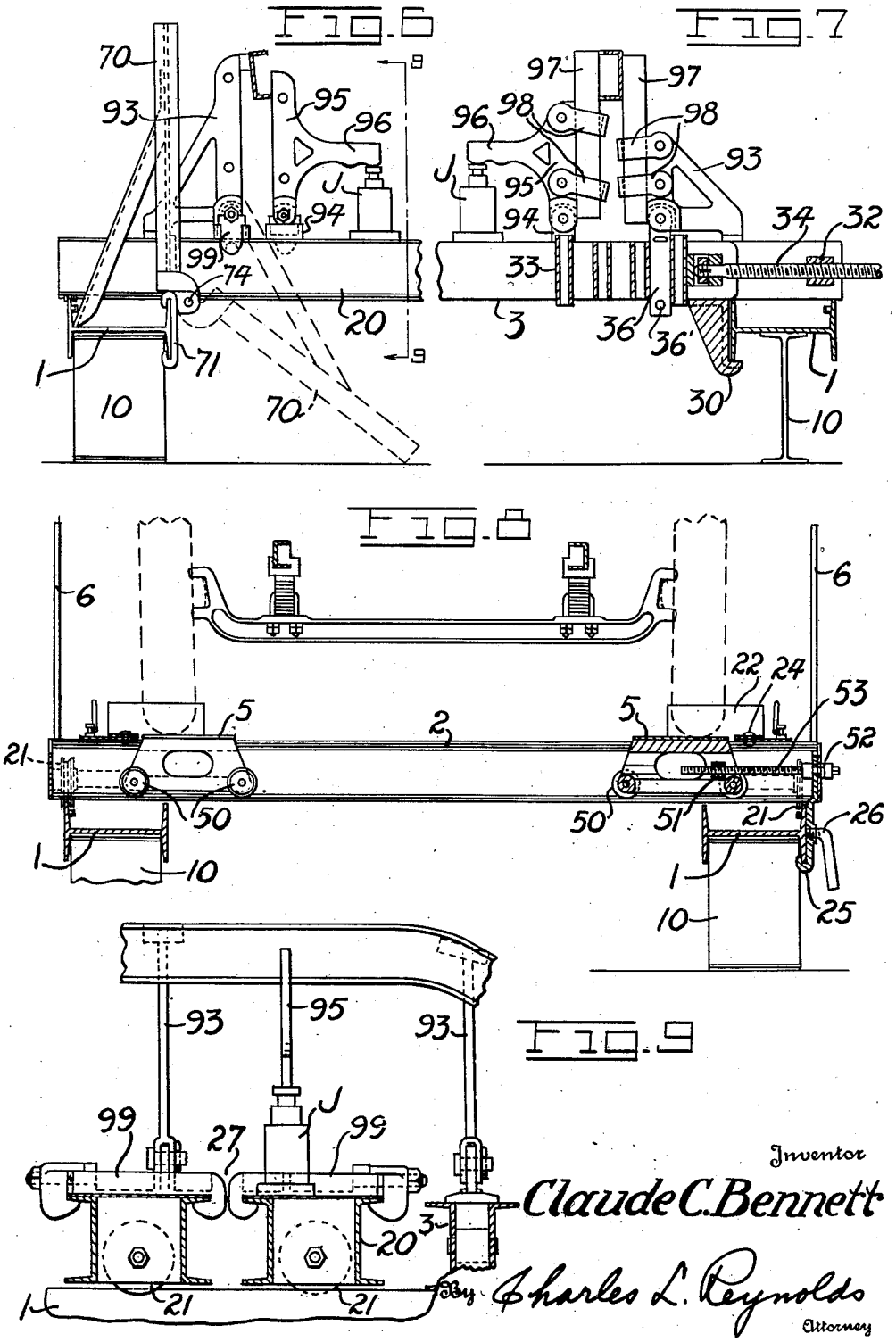

Dec. 20, 1938.  C. C. BENNETT  2,140,686
FRAME STRAIGHTENER
Filed April 16, 1934  7 Sheets-Sheet 5
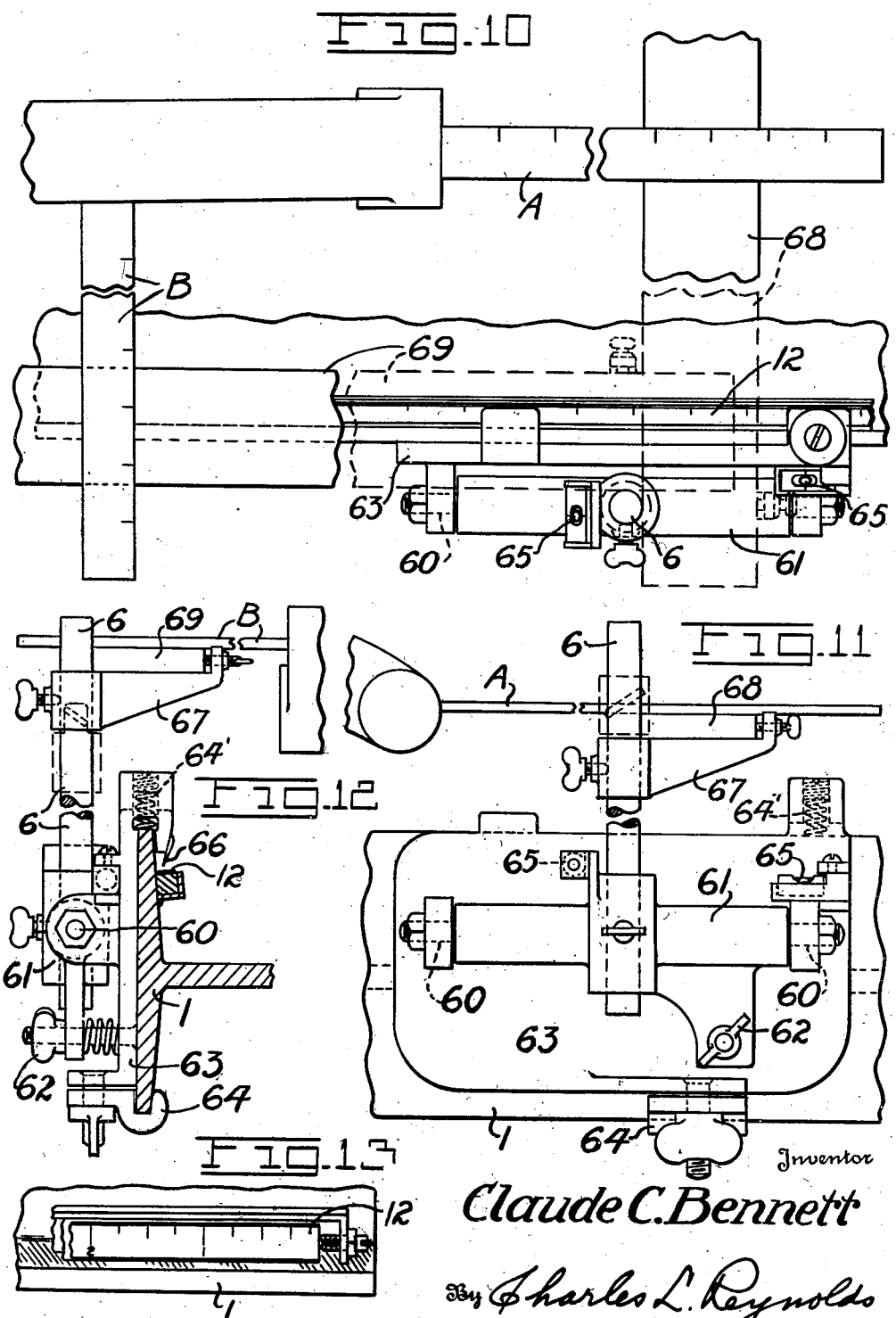
Inventor
Claude C. Bennett
By Charles L. Reynolds
Attorney Dec. 20, 1938.  C. C. BENNETT  2,140,686
FRAME STRAIGHTENER
Filed April 16, 1934  7 Sheets-Sheet 6
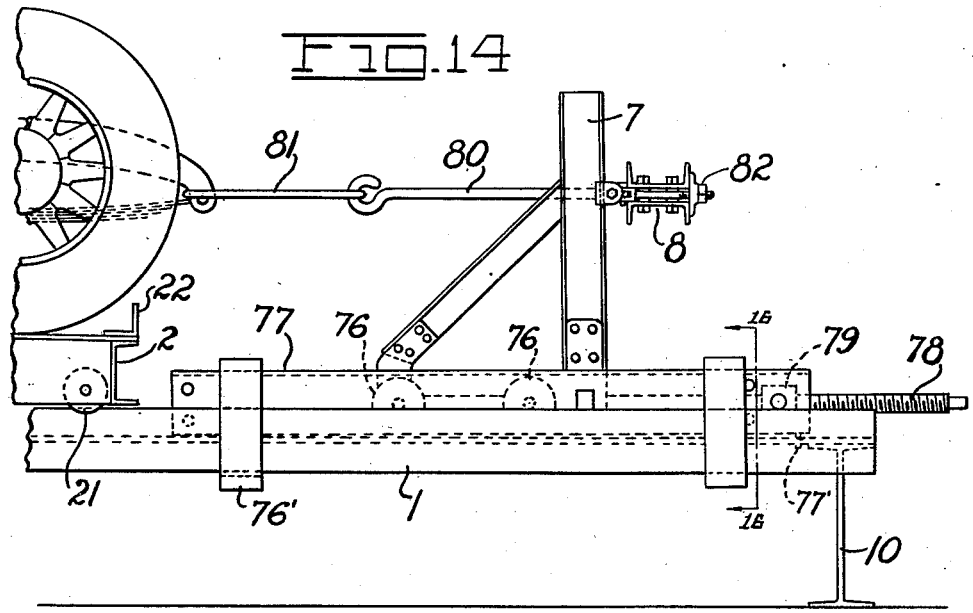
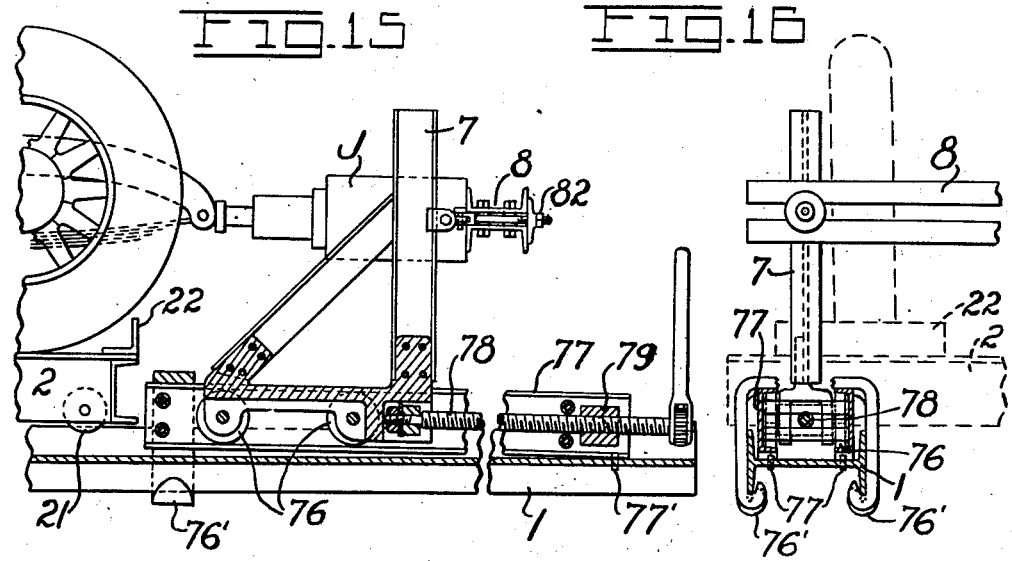
Inventor
Claude C. Bennett
By Charles L. Reynolds
Attorney Dec. 20, 1938.   C. C. BENNETT   2,140,686
FRAME STRAIGHTENER
Filed April 16, 1934   7 Sheets-Sheet 7
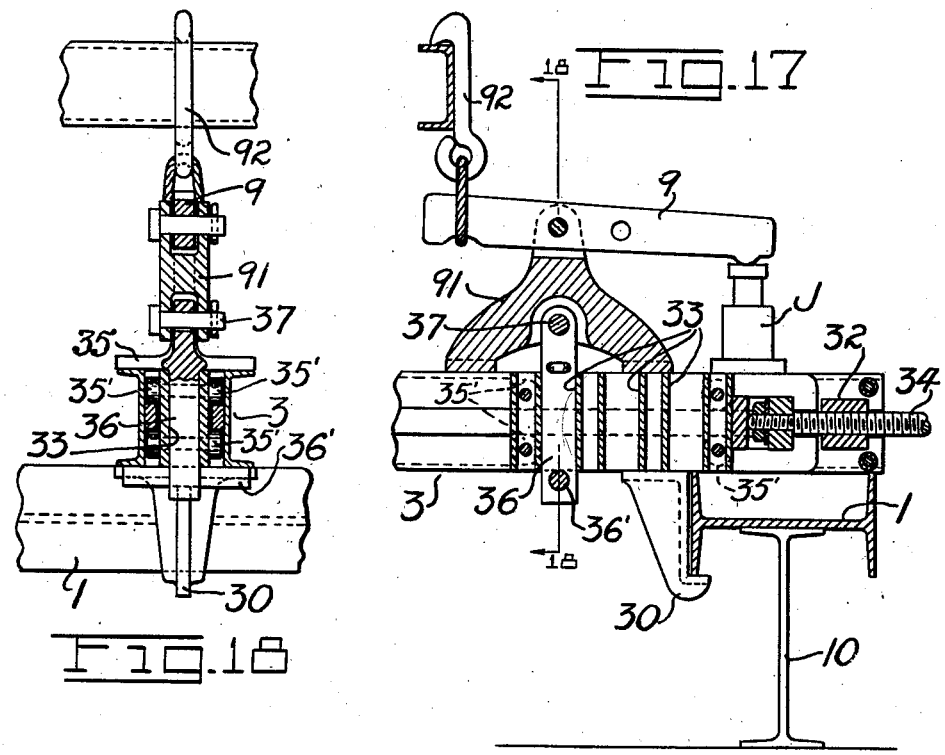
Inventor
Claude C. Bennett
By Charles L. Reynolds
Attorney Patented Dec. 20, 1938

2,140,686

UNITED STATES PATENT OFFICE 2,140,686

FRAME STRAIGHTENER

Claude C. Bennett, Seattle, Wash., assignor to A. E. Feragen, Inc., Seattle, Wash., a corporation of Washington Application April 16, 1934, Serial No. 720,752

21 Claims. (Cl. 153—32)

My invention relates to frame straighteners for use in correcting any distortion of the frame of an automobile, such as may be suffered in an accident.

It is an object of the present invention to provide a frame straightener by which such distortions can be corrected and the frame restored to its original shape and angular relationship of the several parts, usually without removal of the body, and whereby the various operations necessary to this end may be conveniently, effectively, and quickly performed.

Particularly is it an object to provide a frame straightener wherein the workman operating upon the car has the maximum of free space within which to move about and perform the necessary adjustments and operations.

It is a further object to provide a frame straightener having associated with it means for checking or gauging the distortion, and for determining when the corrective measures have progressed far enough, which gauging devices may be employed during the time that the corrective measures are progressing, and with the operating tools in place.

It is a further object to provide a frame straightener capable of the maximum of flexibility to the end that general or localized corrective measures may be applied to the frame as a whole, or to any portion thereof which needs correction.

It is also an object to provide a frame straightener whereby the corners of the frame may be engaged and these corners pulled or pushed, as may be necessary, in a horizontal plane, to correct any distortion in this plane, in the angular relationship of the parts thereof.

It is also an object to provide a frame straightener wherein the several parts which must in operation project above the level of the supporting frame may be thrown down or be otherwise quickly and easily moved out of the way to enable the car to be run onto the frame straightener, or as conveniently be replaced.

It is also an object to eliminate runways and tracks, in so far as possible, which will obstruct easy access to the space beneath the car, and to make such runways as are necessary removable, so that the car may be run onto the frame straightener, and by its action cause separation of the members which are intended to support the front and rear wheels, respectively, these being closely adjacent to receive the car.

Another object is to provide means whereby hydraulic jacks may be applied to the frame, especially to the corners thereof, and to provide additional means whereby movement in excess of the reasonable stroke of such hydraulic jacks may be effected without removing the hydraulic jacks, leaving to the latter the task of accomplishing the final small changes.

It is a further object to provide means incorporated in such a straightener for shifting the car wheels transversely to position them properly with respect to the operating devices, when necessary, and particularly with respect to the gauging devices, and further, to give effect, without dragging of the wheels, to transverse bending movements effected by the operating tools.

It is also an object to provide a frame straightener wherein all adjustments or gauging, and all operations other than bending or twisting the central parts of the car frame can be accomplished by a workman standing alongside of the straightener, rather than underneath the car.

It is a further object to devise improved operating tools for use in connection with such a frame straightener for application to the frame parts to accomplish all necessary pulling, pushing, twisting, and bending operations, and to provide means which may be applied to the axles, while the car is supported on the frame straightener, to accomplish like operations upon the axles.

Other objects, and especially such as relate to mechanical details and to the working tools themselves, will be observed as this specification progresses.

My invention comprises the novel frame straightener, as shown in the accompanying drawings and as will be hereinafter disclosed and defined, and the novel operating tools, gauge means and accessories, all as will appear hereafter.

In the accompanying drawings I have shown my device embodied in a preferred form, and with various modifications and alternative operating tools.

Figure 1 is a side elevation, with parts broken away, of the frame straightener, showing parts in the position they would assume when a car is being run upon the frame straightener, except as certain gauging parts are shown in the positions they would assume during gauging.

Figure 2 is a side elevation of the complete frame straightener, shown with parts in position to accomplish an upward bending operation upon the central part of the frame.

Figure 3 is a plan view of the frame straightener, corresponding generally to Figure 2.

Figure 4 is a fragmentary plan view of the frame straightener, showing parts disposed for a different operation.

Figure 5 is an enlarged plan view of the frame straightener, with parts broken away, showing the device in the position to receive a car.

Figure 6 is an end elevation of one side of the frame straightener, showing a twisting operation upon the channel frame of the car, and Figure 7 is a transverse sectional view illustrating a similar operation, with alternative operating tools.

Figure 8 is a transverse section through one of the tables, illustrating the manner in which the wheels may be shifted transversely of the device as a whole.

Figure 9 is a longitudinal fragmentary section on the line 9—9 of Figure 6.

Figure 10 is a plan view, with parts broken away, illustrating the manner in which the gauging device may be used, and Figure 11 is an elevation of the same device, while Figure 12 is a transverse section of the same.

Figure 13 is a detail plan view of the scale which may be employed in connection with the gauging operation.

Figure 14 is a side elevation of a modified corner post arrangement, showing the device set up for pulling or resisting at one corner of the car frame.

Figure 15 is a longitudinal section, corresponding generally to Figure 14, showing parts set up for a pushing operation at one corner of the car frame.

Figure 16 is a transverse sectional view along the line 16—16 of Figure 14.

Figure 17 is a transverse sectional view through one of the reaction members, illustrating the operation of pulling down on the frame, and Figure 18 is a transverse sectional view through the same, substantially on the line 18—18 of Figure 17.

Cars which have been in collisions frequently have the frame distorted in one way or another. If one of the front corners of the car has struck another object, this corner may be pushed back, so that the front axle, and usually also the rear axle, do not extend transversely of the car, but at somewhat of an angle. If the car has been struck from the side the channel members composing the main frame of the car may be bent at the point of impact, and may also be twisted. In striking another object, head on, or being struck from the rear, the frame may buckle up or down at an intermediate point. Such distortion should be removed from the frame by bending or twisting it back to its original position and relationship to the other parts. However, in bending the frame parts back to their original positions care should be taken that the frame is not otherwise distorted, for ease in steering, tire wear, and the general strength and safety of the automobile is dependent upon all parts being in their proper relationship. Furthermore, because of the cost and time consumed in removing a body, which may not have been injured itself or which may have been injured only so slightly as to require minor repairs, not necessitating removal, it is preferable that the frame of the car be straightened without removing the body, and there is another consideration which makes this highly desirable in that the body bolts of the body and chassis must pass through holes that are normally aligned, but the alignment of which may be destroyed if the chassis is straightened with the body removed. If the chassis is restored to its original position with the body removed, the body, which is usually distorted also, will not be restored to its original condition, and not only will not properly fit the chassis, but doors will have a tendency to stick or rattle, whereas if the body is left in place it, too, will be restored to proper shape by restoration of the frame. Thus while my drawings show no body on the chassis which is being operated upon, this is only for better illustration, it being preferred that the body be left in place upon the car frame, though the operations will sometimes be facilitated by removal of running boards and aprons, and these generally need to be removed to be straightened or replaced.

In effect my frame straightener comprises two frame members 1 which may consist of heavy I-beams spaced apart an amount approximately equal to the spacing between the wheels at opposite sides of an automobile. To give the greatest freedom of movement to the workman who must move about under the car I prefer that these be not connected across, but that they be anchored to the floor and supported thereabove by means such as the feet 10. These feet are shown as generally of I-beam section, though any suitable form may be employed, and are so placed as to resist flexure both transversely and longitudinally of the frame members 1 which they support.

These frame members 1, being placed parallel to each other, may serve as rails upon which are mounted carriages generally designated by the numerals 2 and 20. These carriages are in effect tables, the table 2 being intended to receive the front wheels F of a car, and the rear table 20 receives the rear wheels R, although the car may be placed on the straightener in the reverse position, yet for ease in running it onto the straightener under its own power I prefer that it be placed in the manner indicated.

The tables 2 and 20 will be described in detail hereafter. Suffice it to say here that each is provided with wheels 21 mounted upon the flanges of the frame members 1 to roll therealong. The table 2 is provided with a wheel stop or chock 22 at its forward edge, over which the front wheel F will not readily ride, and should be provided with a second chock 23 which can be positioned in the rear of the wheel, and which is pivoted at 24 so that it can be swung aside to permit a wheel to roll onto the table, but can be swung in behind the wheel after it rests upon the table. It is not necessary that there be similar chocks on the rear table 20, although these may be provided if desired. Each of these tables is preferably provided with a depending hook 25 which extends beneath the lower edge of the flange of the frame member 1 to prevent it being displaced or thrown from the track, or lifted by an upwardly-acting force, and each is preferably provided also with a locking screw 26, by means of which it can be clamped in position (see Figure 8).

For working upon the frame, and for supporting tools which operate thereon, I provide one or more, preferably three, reaction members 3. These consist generally of bars extending across from one frame member 1 to the other, but loosely resting on top of the same, so that they can be shifted to any point desired, or can be removed at will. However, it is necessary to provide them with hooks 30 corresponding to the hooks 25 to resist an upwardly acting force, pulling down on the car frame, and they also prevent accidental lifting or removal of the members 3. The latter are of substantially the same height as the tables 2 and 20, as will be seen best in Figure 1, and would normally be interposed between the two tables.

Since the frame straightener will ordinarily be installed elevated above the floor it is necessary to provide a ramp 4 or similar runway means, whereby the car may be run up onto the straightener, but for conserving floor space and to provide freer movement from one side to the other of the straightener I prefer that these ramps be removable, and have therefore shown the ramp 4 as provided with hooks 40 which may be engaged with an upstanding member 8 resting upon the frame member (which member 8 has a further function as will appear hereafter), and I prefer also to provide a bridge member 41 which extends from this member 8 to the table 20, this bridge member 41 forming part of the runway, being provided with hooks 42 at each end to support it. Thus the runway member 41 is also removable, and only serves the purpose of carrying the car from the ramp 4 along the same level to the top of the table 20.

When a car is to be run onto the straightener the table 2 is brought close to the table 20. If the reaction members 3 are interposed between them they may be slid along until they are closely adjacent to each other and to the two tables. A car may now be run up the ramp 4, across the bridge 41, and onto the table 20, and then over the reaction members 3 onto the table 2, where its front wheels engage the chocks 22. If the car is mounting under its own power the rear wheel on the ramp will push the front wheels forward, carrying along the forward table 2, and separating this table from the reaction members and from the rear table 20. The car continues to move forward until the rear wheels R come to rest on the table 20, and the car is then properly positioned for any operation, although it may be shifted longitudinally by freeing the locking screws 26 and shifting the tables lengthwise of the frame members 1. If the car cannot operate under its own power, a winch (not shown) can be mounted on a strongback bar 18, at the forward end of the frame straightener (as will be described later), to pull the car up.

It may be desirable to shift the car, especially the front wheels, laterally after it is on the frame straightener, and to this end I provide carriages 5 (see Figure 8) which may be located to receive the opposite wheels of a pair, and to move transversely of the straightener as a whole within a central slot 27 of the table 2. It may be mounted upon rollers 50, and may carry a nut 51 in which is threaded a screw 53 swiveled at 52 in the outer end of the table 2, so that by turning the screw the carriage 5 may be moved transversely. It is not essential that both the carriages be screw-controlled; in fact it is preferable that only one be so movable, for the other will follow freely any movment of the screw-controlled carriage. While I have not shown such carriages in association with the rear table 20, it is obvious that they might be employed here as well, but transverse shifting of one end of the car will usually be sufficient for the main purpose, which is to align it with certain gauging devices to be explained hereafter.

We may assume that a car has been run onto the frame straightener in the manner heretofore described, and that the car has been in a collision which would tend to make the frame diamond-shaped, that is, pushed back at one front corner. It may be desired first to ascertain if this is the fact and by what amount. Accordingly gauge means are provided to assist in determining this. As may be seen generally in Figures 1 and 2, an upright post 6 is removably mounted upon the frame member 1, and is slidable therealong, but can be secured in position such that it is exactly perpendicular. As may best be seen in Figures 10, 11 and 12, this post is mounted in a member 61 having a pivotal movement at 60 along a longitudinal horizontal axis, and is adjustable about its axis 60 by means of the thumb screw 62. The mounting for this post is secured upon a slide 63 which is mounted upon the frame member 1, and which can be secured in any position by the clamp 64. A spring 64', bearing upon the member 1, permits adjustment by the clamp 64 to correct any deviation of the post 6 from perpendicular in a longitudinal plane. Suitable level or bubble tubes 65 indicate when the post 6 is exactly perpendicular, and a gauge finger 66 cooperates with a scale 12 secured to the frame member 1. This scale is adjustable longitudinally so that the readings on the two sides of the frame straightener will coincide; see Figure 13.

Upon the post 6 is clamped a bracket arm 67, and a straightedge 68 may rest in the bracket 67 of the two posts at opposite sides of the frame straightener, and across these may be laid straightedges 69 which extend alongside of the car, or these may be reversed, the straightedges 69 supporting the straightedges 68. These are each brought close to the post 6, or by the use of scales thereon are brought into such relationship with the car that they form a true rectangle, with the member 69 parallel to the longitudinal axis of the car. Now measurements may be made from the elements of this rectangle to appropriate parts of the car frame, as indicated by the rules A and B (see Figure 10, for example). The index finger 66 cooperating with the scale 12 will make certain that the posts 6 at opposite sides are placed the same distance from the ends of the straightener, and thus will assure that the angles formed by the straightedges 68 and 69 are true right angles. Now if measurements with the rules A and B show a departure of the car frame members from their proper positions, corrective measures may be employed, as indicated by these measurements or by observation.

We may assume that the measurements have shown that the frame is somewhat diamond-shaped, and it is to be pulled back to proper angular relationship of the parts. Corner posts are provided at the four corners of the straightener, those at the forward end being generally upright and indicated at 7. They may be mounted upon a slide 71, whereby they may be moved longitudinally of the frame members 1, and clamped in position when desired by a clamping screw 72, or they may be left free to slide, and sliding movement may be effected by mounting a hydraulic jack J between a knee 73, slidable along and clamped upon the frame member 1, and the forward point 71' of the slide 71. The corner posts at the rear end of the frame straightener may be identical with those described, but to distinguish them from the forward corner posts 7 they have been designated by the numeral 70, and preferably are hingedly mounted at 74 so that they can be thrown down out of the path of a car being run upon or run off of the frame straightener. This is best illustrated in Figure 6. Such corner posts serve as the means of supporting the aforementioned strongback bar 18 (see Figure 2) on a level with the corners of the car frame. Thus these strongbacks may be secured upon a bolt 75 slidable vertically of the corner post 70, and from these strongback bars rods 80 extend, either to directly engage the horns of the car frame at the corners thereof, or through the intermediary of cables or links 81 to engage these horns. A pulling action may be accomplished now by drawing up the nuts 82 on the rods 80, or preferably by operation of the jack J. Ordinarily the diagonally opposite corners would be pulled, and the other corners would merely be held stationary.

If a horn is bent, a pull may be exerted in similar manner on this horn, resisting the pull at the other end of the car at the same side, or by holding or pushing the same end of the car at the opposite side. By heating the bent horn, while thus stressed, it may readily be restored to its proper position.

In Figure 14 I have illustrated an alternative form of corner post and mounting therefor. Instead of the corner post being slidable directly upon the frame member 1, it is mounted upon wheels 76 guided for movement longitudinally of the frame member in an auxiliary frame 77. The corner post is movable relative to this auxiliary frame 77 by a screw 78 threaded in a nut 79 in the auxiliary frame. The pulling movement may be effected by rotation of the screw 78. If it is desired to push on a corner of the frame, a jack J may be inserted between the corner of the car frame and the strongback bar 8, as seen in Figure 15, and the greater part of the movement be effected by operation of the screw 78, leaving to the jack J the accomplishment of the final movement. This may be preferable in some cases because the movement required to return the frame to proper position may be somewhat in excess of the normal stroke of the jack J, and the greater amount of this movement may be accomplished by the screw 78, and the jack may be moved only a short distance as compared to the whole movement necessary. The auxiliary frame 77 will be suitably anchored in any given position by projection of a pin 77' through suitable holes provided in the frame member 1, and it may be held from rising by a suitable hook 76'.

If it is determined that the channel members of the car frame or the cross bracing members have been buckled, bent or twisted, use is made of the reaction members 3. These may be formed, as shown, of spaced channels 31 connected only at their ends by blocks 32. In the space thus formed are slidable two socketed slides 33 (see Figures 3, 4, 5, 7, and 17), the movement of which may be controlled by a screw 34 threaded each in one of the blocks 32. These slides 33 may be supported merely by extension of a flanged portion 35 over the flanges of the rails 31, or they may be supported by rollers 35', as seen in Figure 18.

The sockets in these members 33 afford anchoring means for bars 36, as shown in Figures 7 and 17, for example, through which hold-down pins 36' may be passed, and to which a variety of operating tools may be secured. The reaction members 3 also serve as tables for the support of tools or jacks, and hooks for pulling or holding down may be engaged with their under sides, as shown in Figure 2, for example. In this case the hooks 30, referred to previously, will hold down the reaction members against the lifting effort of the jack J.

The operating tools employed may be of various types. However, it should be remembered that they should be easily removable or capable of being dropped to a level where they will not interfere with the movement of a car onto or off of the frame straightener. In Figure 2 I have shown a jack J engaging a downwardly buckled portion of the car frame, with links 90 engaged with the car frame and with the reaction members 3, respectively, to resist the upward thrust of the jack. In Figures 17 and 18 I have shown another type of tool for effecting a downward pull on the frame, comprising a lever 9 pivoted in a frame 91, which rests upon the reaction member 3, one end of it engaging a hook 92, and the other end being acted upon by a jack J, which likewise rests upon the reaction member 3. The foot 91 is anchored in place by a bar 36 secured to it by the pin 37.

In Figures 6, 7 and 9 I have shown tools for effecting a twisting operation. A resisting tool 93 is of angular shape, and is anchored, and preferably pivoted, upon a member 94 received in the reaction members 3, preferably in a socket in the member 33. A twisting member 95 is similarly supported from the reaction member 3, and has an arm 96 beneath which may be engaged a jack J resting upon the member 3. These members 93 and 95 would ordinarily be spaced along the car frame, two holding members engaging it at one side, and an active bending member engaging it at the opposite side. This is best shown in Figure 9, where, however, the tools are shown mounted upon the table 20, secured by clamps 99. The arrangement shown in Figure 7 is similar, save that removable bars 97 are received in clevises 98 pivotally mounted upon the respective members 93 and 95, so that by the use of longer or shorter bars the device may be adjusted for cars whose frame is higher or lower than can be conveniently reached by standard-height members such as are shown in Figure 6.

Occasionally it will be found convenient to straighten the axle, especially the front axle of a car, while the car is supported upon the frame straightener, and to this end I have provided in the forward table 2 a slot 27 and supplemental slots 28, within which may be engaged suitable axle setting devices. Jacks for producing the active bending forces may be supported upon the surface of the table 2, and hold-down bars may be received in the slots 27 and 28, but as such devices are common in axle setters I have not illustrated the same here.

It will be observed that the space between the two frame members 1 is entirely free and clear, so that a workman may climb in between the car frame and the frame members 1, and may move about beneath the car, except as the reaction members 3 are positioned for performing a given operation. These latter, however, are loose and are freely movable by sliding them back and forth along the frame members 1, and being loose they can be set somewhat at an angle as seen in Figure 3, and their spacing can be varied readily as may suit the requirements of the given operation. All parts which would obstruct the movement of a car onto or from the frame straightener are readily removable and readily set up again. The parts of the car upon which the operations are to be performed are thus freely accessible by the workman and to the tools which he will employ, and for purposes of gauging. The device conserves floor space in that the ramps are removable, and this further assists accessibility and freedom of movement of the workman.

What I claim as my invention is:

1. A frame straightener comprising a pair of spaced frame members, means thereon disposed above the level thereof to support a car, transverse reaction members spaced longitudinally of the car, disposed above and loosely resting upon the frame members, and means extending between the reaction members and the car frame to apply a bending force to the car frame.

2. A frame straightener comprising a pair of spaced frame members, a table mounted thereon and movable therealong while supporting the front wheels of a car, means likewise mounted upon the frame members, for supporting the rear wheels of the car, transverse reaction members loosely supported upon the frame members, and means extending between the reaction members and the car frame to apply a bending force to the car frame.

3. A frame straightener comprising a pair of spaced frame members adapted to support a car disposed longitudinally thereof, transverse reaction members disposed above and loosely resting upon the frame members, and cooperating means extending between any given reaction member and the car frame at spaced points, to apply a twisting force to the car frame.

4. A frame straightener comprising a pair of spaced frame members adapted to support a car disposed longitudinally thereof, transverse reaction members supported upon the frame members, a socketed member movable lengthwise of each reaction member, a screw jack for effecting such movement, and posts upstandingly received in such sockets and adapted to bear against the sides of the car frame.

5. A frame straightener comprising a pair of spaced frame members adapted to support a car disposed longitudinally thereof, transverse reaction members supported upon the frame members, a socketed member movable lengthwise of each reaction member, power means for effecting such movement, and tool means engaged in said sockets and operatively engaged with the car frame to alter it.

6. A frame straightener and gauge comprising a pair of spaced frame members, a transverse table supported thereon, a carriage at each side of and supported upon said table and movable lengthwise thereof, or transversely of the frame members, to support the respectively opposite wheels of a pair upon the car, means to effect such movement of the carriages, and means to define a rectangle surrounding the car thus supported.

7. A frame straightener and gauge comprising a pair of spaced frame members, a transverse table supported thereon, a carriage at each side of and supported upon said table and movable lengthwise thereof, or transversely of the frame members, to support the respectively opposite wheels of a pair upon the car, means to effect such movement of the carriages, means to define a rectangle surrounding the car thus supported, and means supported from the frame members beneath the car for bending or otherwise altering the frame of the car.

8. A frame straightener comprising a pair of spaced beams constituting frame members, means to support a car thereon, disposed longitudinally, a corner post disposed at each corner of the car, thus disposed, said corner posts being supported and braced from the beams, and means reacting from said corner posts to engage the respective corners of the car frame, at will, to effect a restoration thereof to its original angles.

9. A frame straightener comprising a pair of spaced beams constituting frame members, means to support a car thereon, disposed longitudinally, a corner post disposed at each corner of the car, thus disposed, said corner posts being supported and braced from the beams, and adjustable therealong, a strongback bar extending between the two corner posts at each end of the frame, and means extending between the strongback bars and the respective corners of the car frame to apply a push or a pull to the corners, as required to restore the frame to its original angular relationship.

10. A frame straightener comprising a pair of spaced beams constituting frame members, means to support a car thereon, disposed longitudinally, a corner post disposed at each corner of the car, thus disposed, said corner posts being supported and braced from the beams, and adjustable therealong, means reacting from said corner posts to engage the respective corners of the car frame, at will, to effect a restoration thereof to its original angles, and means to form a rectangle surrounding the car, from which to gauge the car frame during such restoration.

11. A frame straightener comprising a pair of spaced frame members, means to support a car thereon, disposed longitudinally, a corner post disposed at each corner of the car, thus disposed, said corner posts being supported and braced from the frame members, means reacting from said corner posts to engage the respective corners of the car frame, at will, to effect a restoration thereof to its original angles, and jack means to shift the corner posts longitudinally of the frame members.

12. A frame straightener comprising a pair of spaced frame members, means to roll a car thereon, lengthwise, a corner post disposed at each corner of a car, thus supported, said corner posts being supported and braced from the frame members, means hingedly supporting certain of said corner posts, to permit passage of the car thereover, and means reacting from said corner posts to engage the respective corners of the car frame, at will, to effect a restoration thereof to its original angular relationship.

13. A frame straightener comprising a pair of spaced frame members, a table mounted thereon and movable therealong while supporting the front wheels of a car, a similar table similarly mounted and movable to support the rear wheels of a car, a wheel stop on the first table to engage the front wheels of the car, runway means guiding a car over the second table to the first, and when the wheel stop means engages the front wheels, guiding the rear wheels onto the second table, the first table meanwhile moving along the frame members to space the two tables, and tool means supported from the frame members intermediate the two tables to apply forces to the car frame.

14. A frame straightener comprising a pair of spaced frame members, a table mounted thereon and movable therealong while supporting the front wheels of a car, a similar table similarly mounted and movable to support the rear wheels of a car, a wheel stop on the first table to engage the front wheels of the car, runway means guiding a car over the second table to the first, and when the wheel stop means engages the front wheels, guiding the rear wheels onto the second table, the first table meanwhile moving along the frame members to space the two tables, tool means supported from the frame members intermediate the two tables to apply forces to the car frame, means to lock the respective tables to the frame members, and means associated with each of said tables to shift the car wheels transversely of the frame members.

15. A frame straightener comprising a pair of spaced frame members, a table mounted thereon and movable therealong while supporting the front wheels of a car, a similar table similarly mounted and movable to support the rear wheels of a car, a wheel stop on the first table to engage the front wheels of the car, runway means guiding a car over the second table to the first, and when the wheel stop means engages the front wheels, guiding the rear wheels onto the second table, the first table meanwhile moving along the frame members to space the two tables, tool means supported from the frame members intermediate the two tables to apply forces to the car frame, gauge means supported from the frame members to form a rectangle about the car thus supported, whereby the departure of its members from original angular relationship can be determined, and means associated with the respective tables to shift the car wheels transversely of the frame members.

16. A frame straightener comprising two spaced, unconnected, substantially parallel frame members, the space between them being free of obstructions, a table extending over each frame member and supported thereon for movement longitudinally thereof, a second table similarly disposed, adjacent which the first table may be placed to receive a car, runway means at one end of the frame members guiding a car for movement longitudinally of the frame members to dispose the front wheels on the first table, this table then advancing with the front wheels until the rear wheels rest upon the second table, transverse loose reaction members adapted to rest upon the two frame members intermediate the tables, and tool means supported from the reaction members to engage and apply forces to the car frame.

17. A frame straightener comprising two spaced, unconnected, substantially parallel frame members, the space between them being free of obstructions, a table extending over each frame member and supported thereon for movement longitudinally thereof, a second table similarly disposed, adjacent which the first table may be placed to receive a car, runway means at one end of the frame members guiding a car for movement longitudinally of the frame members to dispose the front wheels on the first table, this table then advancing with the front wheels until the rear wheels rest upon the second table, means supported from the frame members at the corners of the car frame, and engageable with these corners to anchor the car, transverse loose reaction members adapted to rest upon the two frame members intermediate the tables, and tool means supported from the reaction members to engage and apply forces to the car frame.

18. A frame straightener comprising a framework, a pair of tables separately and independently mounted on said framework and movable with respect to said framework while supporting the wheels of a car, and force-applying members reacting between the framework and a car thus supported to apply a bending force to the car frame.

19. A frame straightener comprising a framework, a plurality of tables movable lengthwise of said framework while supporting a car, transverse reaction members supported upon said framework, and means extending between the reaction members and the car frame to apply a bending force to the car frame.

20. A frame straightener comprising a framework, a plurality of tables movable lengthwise of said framework while supporting a car, transverse reaction members loosely supported upon said framework for movement lengthwise thereof, and means extending between the reaction members and the car frame to apply a bending force to the car frame.

21. A frame straightener for an automotive vehicle having a chassis frame, comprising a pair of spaced frame members, a plurality of vehicle supporting table members so mounted upon said frame members as to be movable lengthwise thereof, a plurality of reaction members slidably supported upon said frame members and interposed between said table members, and means extending between said reaction members and the frame of the vehicle to apply a bending force to the vehicle frame.

CLAUDE C. BENNETT.